US011732166B2

(12) United States Patent
O'Brien et al.

(10) Patent No.: US 11,732,166 B2
(45) Date of Patent: Aug. 22, 2023

(54) FAST SET MOISTURE CURABLE HOT MELT ADHESIVE COMPOSITION AND ARTICLES INCLUDING THE SAME

(71) Applicant: H.B. Fuller Company, St. Paul, MN (US)

(72) Inventors: Kellen E. O'Brien, St. Paul, MN (US); Marlen A. Valverde, Stillwater, MN (US); Chao Wang, Woodbury, MN (US); Chue Moua, Woodbury, MN (US)

(73) Assignee: H.B. Fuller Company, St. Paul, MN (US)

( * ) Notice: Subject to any disclaimer, the term of this patent is extended or adjusted under 35 U.S.C. 154(b) by 478 days.

(21) Appl. No.: 17/003,549

(22) Filed: Aug. 26, 2020

(65) Prior Publication Data

US 2021/0062055 A1    Mar. 4, 2021

Related U.S. Application Data

(60) Provisional application No. 62/891,808, filed on Aug. 26, 2019.

(51) Int. Cl.
| | |
|---|---|
| *C09J 175/04* | (2006.01) |
| *C08G 18/42* | (2006.01) |
| *C08G 18/72* | (2006.01) |
| *C09J 5/06* | (2006.01) |
| *C08K 3/34* | (2006.01) |
| *C08L 23/08* | (2006.01) |

(52) U.S. Cl.
CPC ........ *C09J 175/04* (2013.01); *C08G 18/4261* (2013.01); *C08G 18/72* (2013.01); *C09J 5/06* (2013.01); *C08K 3/346* (2013.01); *C08L 23/0853* (2013.01); *C08L 23/0869* (2013.01); *C09J 2301/304* (2020.08); *C09J 2301/408* (2020.08); *C09J 2423/106* (2013.01); *C09J 2469/006* (2013.01)

(58) Field of Classification Search
None
See application file for complete search history.

(56) References Cited

U.S. PATENT DOCUMENTS

| | | | |
|---|---|---|---|
| 5,472,785 A * | 12/1995 | Stobbie, IV | ............ C08L 91/06 525/440.12 |
| 5,939,499 A * | 8/1999 | Anderson | ............... C09J 175/04 525/440.15 |
| 6,355,317 B1 | 3/2002 | Reid et al. | |
| 6,387,449 B1 | 5/2002 | Reid et al. | |
| 6,803,412 B2 | 10/2004 | Nguyen-Misra et al. | |
| 8,822,031 B2 * | 9/2014 | Helmeke | ................... B32B 7/12 156/332 |
| 9,487,683 B2 | 11/2016 | Bunnelle et al. | |
| 9,605,187 B2 | 3/2017 | Helmeke et al. | |
| 10,253,227 B2 | 4/2019 | Yao | |
| 2003/0149216 A1 | 8/2003 | Ichihashi et al. | |
| 2006/0025555 A1 | 2/2006 | Ichihashi et al. | |
| 2008/0292902 A1 * | 11/2008 | Reid | .................. C08G 18/2825 156/332 |
| 2010/0249291 A1 | 9/2010 | Ichihashi et al. | |
| 2010/0324254 A1 | 12/2010 | Saiki | |
| 2011/0275767 A1 | 11/2011 | Yamakoshi et al. | |
| 2012/0142885 A1 | 6/2012 | Matsuki et al. | |
| 2013/0345354 A1 | 12/2013 | Tamogami et al. | |
| 2014/0231008 A1 | 8/2014 | Wang | |
| 2016/0355713 A1 | 12/2016 | Tsuno et al. | |
| 2018/0258330 A1 | 9/2018 | Pillalamarri et al. | |
| 2018/0298254 A1 | 10/2018 | Matsuda et al. | |
| 2018/0346775 A1 | 12/2018 | Schmider et al. | |
| 2020/0407610 A1 | 12/2020 | Kinoshita et al. | |

FOREIGN PATENT DOCUMENTS

| | | | | |
|---|---|---|---|---|
| JP | 2015052063 A | 3/2015 | | |
| JP | 2016204541 A | 12/2016 | | |
| JP | 2018177937 A | 11/2018 | | |
| WO | WO 2011-109629 | 9/2011 | | |
| WO | WO 2013-016130 | 1/2013 | | |
| WO | WO2015080283 | 6/2015 | | |
| WO | WO-2015129529 A1 * | 9/2015 | ......... | C08G 18/4018 |
| WO | WO2009145316 | 5/2019 | | |

OTHER PUBLICATIONS

Pearlbond ECO 590 data sheet, Aug. 2018. (Year: 2018).*
Terathane PTMEG product literature, 2019, 2 pages, The Lycra Company.
Dupont Hytrel 3078 Thermoplastic Polyester Elastomer product literature, 2017, pp. 1-10, DuPont de Nemours and Company, Delaware, US.
Pearlbond Eco 590 technical data sheet, Aug. 2018, 2 pages, The Lubrizol Corporation.
Levamelt 456 ethylene-vinyl acetate copolymer product literature, Aug. 13, 2018, pp. 1-2, Lanxess Deutschland GmbH, Germany.
Dynacoll 7490 crystalline copolyester product literature, Aug. 27, 2008, pp. 1-2, Evonik Resource Efficiency GmbH, Germany.
Kristalex 5140 hydrocarbon resin Technical Data Sheet, 2019, 3 pages, Eastman Chemical Company.

(Continued)

*Primary Examiner* — Christopher M Rodd
(74) *Attorney, Agent, or Firm* — Allison Johnson; Kirsten Stone (57) ABSTRACT

A moisture curable hot melt adhesive composition that includes isocyanate-terminated polyurethane prepolymer that includes the reaction product of a crystalline polyester polyol, a polyether polyol, and diisocyanate, clay, polyester/polyether elastomer, a first thermoplastic polymer selected from the group consisting of ethylene vinyl acetate copolymer, ethylene (alkyl)acrylate copolymer, and combinations thereof, a tackifying agent, and optionally a second thermoplastic polymer selected from the group consisting of thermoplastic polyurethane, thermoplastic polycaprolactone, and combinations thereof.

29 Claims, 2 Drawing Sheets

(56) References Cited

OTHER PUBLICATIONS

Snobrite white kaolin fillers and extenders technical data sheet, Aug. 2014, 2 pages, UNIMIN Specialty Minerals Inc.
Hikotack P-110S aromatic hydrocarbon resin product literature, Jan. 2015, pp. 1-2, Kolon Industries, Korea.

* cited by examiner

FAST SET MOISTURE CURABLE HOT MELT ADHESIVE COMPOSITION AND ARTICLES INCLUDING THE SAME

This application claims the benefit of U.S. Provisional Patent Application No. 62/891,808 filed on Aug. 26, 2019, which is incorporated herein.

BACKGROUND

The invention is directed to formulating moisture curable hot melt adhesive compositions.

Efforts are constantly being made to improve manufacturing processes. In the automotive industry, for example, there are many parts that require adhesives in their assembly. For many of these parts, it is important that the adhesive rapidly achieve a sufficient level of strength to enable a part made therefrom to be tested (e.g., for reliability and moisture impervious seal) and to be further processed in a relatively short period of time. If the requisite bond strength is not achieved rapidly, then the assembled parts might come apart during further processing or testing. In addition, subsequent manufacturing steps that depend upon the assembled part might have to be delayed in order to accommodate the additional time required to achieve the requisite level of bond strength for the part. Aesthetics are also important for parts that are visible to the consumer.

Moisture curable hot melt polyurethane adhesive compositions are known and are used in a variety of applications, U.S. Pat. No. 9,605,187 discloses moisture curable hot melt adhesive compositions. In the examples of the '187 patent, the prepolymer is formed from DYNACOLL 7380, which has a time to crystallization peak of 76.80 seconds (s), a crystallization peak temperature of 52.6° C., and a crystallization rate of 0.58° C./second (° C./s), as measured by the Crystallization by DSC Test Method.

Some moisture curable hot melt polyurethane adhesive compositions do not exhibit a sufficiently high bond strength in a sufficiently short period of time, sufficient high temperature strength, dimensional stability in an uncured state at high temperatures, or a combination of such properties, to be useful in some industrial applications including, e.g., applications in the automotive industry. Some hot melt moisture curable polyurethane adhesive compositions can flow out of the bond line during cure so as to become visible to a user of a part made with the adhesive. This can create an aesthetically undesirable part and can lead to rejection of the part.

There is a need for a hot melt adhesive composition that exhibits good bond strength in a short period of time and good high temperature strength.

SUMMARY

In one aspect, the invention features a moisture curable hot melt adhesive composition that includes an isocyanate-terminated polyurethane prepolymer that includes the reaction product of a crystalline polyester polyol that exhibits a crystallization peak temperature of at least 55° C., a polyether polyol, and diisocyanate, clay, polyester/polyether thermoplastic elastomer, a first thermoplastic polymer selected from the group consisting of ethylene vinyl acetate copolymer, ethylene (alkyl)acrylate copolymer, and combinations thereof, a first tackifying agent, and optionally a second thermoplastic polymer selected from the group consisting of thermoplastic polyurethane, thermoplastic poly-caprolactone. In some embodiments, the crystalline polyester polyol exhibits a crystallization peak temperature of at least 60° C.

In one embodiment, the moisture curable hot melt adhesive composition includes from 10% by weight to 50% by weight isocyanate-terminated polyurethane prepolymer, and from 1% by weight to 40% by weight clay. In another embodiment, the moisture curable hot melt adhesive composition includes from 25% by weight to 45% by weight isocyanate-terminated polyurethane prepolymer, and from 5% by weight to 30% by weight clay.

In other embodiments, the isocyanate-terminated polyurethane prepolymer has an NCO:OH ratio of from 5:1 to 2:1. In another embodiment, the isocyanate-terminated polyurethane prepolymer has an NCO:OH ratio of from 4:1 to 3:1.

In some embodiments, the moisture curable hot melt adhesive composition includes from 10% by weight to 20% by weight clay.

In other embodiments, the moisture curable hot melt adhesive composition includes from 5% by weight to 35% by weight tackifying agent. In one embodiment, the moisture curable hot melt adhesive composition further includes a second tackifying agent (e.g., alpha-methyl styrene tackifying agent).

In another embodiment, the moisture curable hot melt adhesive composition further includes antioxidant.

In some embodiments, the crystalline polyester polyol exhibits a melting point of at least 80° C. In some embodiments, the crystalline polyester polyol exhibits a melting point of at least 90° C. In some embodiments, the crystalline polyester polyol is derived from a diol having at least 2 carbon atoms and a diacid having from 10 to 20 carbon atoms. In other embodiments, the crystalline polyester polyol is derived from a diol having at least 2 carbon atoms and a diacid having from 12 to 20 carbon atoms. In another embodiment, the crystalline polyester polyol is derived from ethylene glycol and a diacid selected from the group consisting of tetradecanedioic acid, dodecanedioic acid, and combinations thereof.

In some embodiments, the second thermoplastic polymer exhibits a melt temperature of at least 80° C.

In one embodiment, the composition exhibits a Five Minute Overlap Shear Strength of at least 100 Newtons. In another embodiment, the composition exhibits a Five Minute Overlap Shear Strength of at least 500 Newtons. In other embodiments, the composition exhibits a Five Minute Overlap Shear Strength of at least 600 Newtons.

In some embodiments, the composition exhibits a High Temperature Overlap Shear Strength of at least 450 Newtons. In other embodiments, the composition exhibits a High Temperature Overlap Shear Strength of at least 640 Newtons.

In another embodiment, the composition passes the Static Load at 3 Minutes Test Method.

In another embodiment, the composition, upon cooling from melt, exhibits a crystallization transition time of no greater than 215 seconds. In other embodiments, the composition, upon cooling from melt, exhibits a crystallization transition temperature of at least 45° C.

In some embodiments, the composition exhibits at least 90% transmittance when tested according to the Fogging Test Method. In other embodiments, composition exhibits 100% transmittance when tested according to the Fogging Test Method.

In another aspect, the invention features an article that includes a first substrate, a second substrate, and a cured moisture curable adhesive composition described above or herein, the first substrate being bonded to the second substrate through the cured adhesive composition. In one embodiment, the first substrate is polycarbonate, and the second substrate is polypropylene. In one embodiment, the article is a head lamp that includes a polycarbonate substrate, a polypropylene substrate, and a cured moisture curable adhesive composition described above or herein, the polycarbonate substrate being bonded to the polypropylene substrate through the cured adhesive composition.

The invention features a moisture curable hot melt adhesive composition that exhibits good adhesion in a relatively short period of time and good high temperature strength.

Other features and advantages will be apparent from the following brief description of the drawings, the description of the preferred embodiments, and from the claims.

DETAILED DESCRIPTION

The moisture curable hot melt adhesive composition includes an isocyanate-terminated polyurethane prepolymer, clay, polyester/polyether elastomer, a first thermoplastic vinyl-derived copolymer, a tackifying agent and optionally a thermoplastic polymer selected from the group consisting of thermoplastic polyurethane, thermoplastic polycaprolactone, and combinations thereof. The moisture curable hot melt adhesive composition, upon cooling from melt, preferably exhibits a crystallization transition at a temperature of at least 40° C., at least 45° C., or even at least 50° C. as determined by the Temperature of Crystallization Transition by Rheology Test Method, and a crystallization transition time of less than 15 minutes, no greater than 10 minutes, no greater than 5 minutes, no greater than 4 minutes, no greater than 215 seconds, no greater than 180 seconds, or even no greater than 120 seconds as determined by the Time to Crystallization Transition by Rheology Test Method.

The moisture curable hot melt adhesive composition also preferably exhibits good adhesive bond strength in a relatively short period of time. One useful measure of the bond strength of an adhesive composition is its capacity to hold a static load. The moisture curable hot melt adhesive composition preferably is able to hold a static load of at least 6.8 kilograms (kg) within three minutes of application, within two minutes of application, or even within one minute of application. The moisture curable hot melt adhesive composition preferably passes the Static Load at Three Minutes test method after one minute, after five minutes, or even after ten minutes. The moisture curable hot melt adhesive composition also can be formulated to pass a Modified Static Load Test Method in which the method is modified such that the adhesive is tested at two minutes, or even at one minute, after the adhesive has been applied to the channel instead of the three minutes specified in the test method. The moisture curable hot melt adhesive composition preferably passes such a Modified Static Load Test Method at one minute, at five minutes, or even at ten minutes.

The moisture curable hot melt adhesive composition preferably exhibits an overlap shear of at least 100 Newtons (N), at least 300 N, at least 400 N, at least 500 N, at least 600 N, at least 700 N, from 500 N to 1500 N, or even from 600 N to 1500 N, when tested according to the Five Minute Overlap Shear Test Method, and a high temperature overlap shear of at least 400 N, at least 450 N, at least 500 N, at least 600 N, at least 640 N, or even from 450 N to 650 N when tested according to the a High Temperature Overlap Shear Strength Test Method at 107° C.

The moisture curable hot melt adhesive composition preferably exhibits at least 60% transmittance, at least 70% transmittance, at least 80% transmittance at least 90% transmittance, or even 100% transmittance when tested according to the Fogging Test Method.

The hotmelt adhesive composition can be formulated to exhibit any suitable viscosity including, e.g., a viscosity of no greater than 30,000 centipoise (cP), no greater than 20,000 cP, no greater than 15,000 cP, no greater than 10,000 cP, or even at least 5000 cP at a temperature of 180° C., 163° C., or even 150° C. The moisture curable hot melt adhesive composition also preferably exhibits an average hourly change in viscosity that is no greater than +/−5%, no greater than +/−3%, or even no greater than +/−2% over an 8 hour testing period at 163° C.

The moisture curable hot melt adhesive composition preferably exhibits no reflow. One useful method of measuring reflow is the Reflow Test Method. The moisture curable hot melt adhesive composition preferably passes the Reflow Test Method.

Isocyanate-Terminated Polyurethane Prepolymer

Useful isocyanate-terminated polyurethane prepolymers include, e.g., the reaction product of crystalline polyester polyol, polyether polyol, diisocyanate, and optionally other polyols, the reaction product of crystalline polyester polyol, diisocyanate, and optionally other polyols, the reaction product of polyether polyol, diisocyanate, and optionally other polyols, and any combination thereof. The stoichiometric ratio of isocyanate groups (NCO) to the sum of the hydroxyl groups (OH) present on the polyol(s) used to form the isocyanate terminated polyurethane prepolymer preferably is no greater than 6:1, from 5:1 to 2:1, from 4:1 to 3:1, or even 3.5:1.

Crystalline Polyester Polyol

The crystalline polyester polyol from which the polyurethane prepolymer is derived includes at least two hydroxyl groups. Useful crystalline polyester polyols have a melting point of at least 80° C., at least 85° C., or even at least 90° C., a crystallization peak temperature of at least 55° C., at least 60° C., or even at least 65° C., and a time to crystallization peak of no greater than 75 seconds (s), no greater than 70 s, no greater than 65 s, no greater than 60 s, or even no greater than 55 s as determined by the Crystallization by DSC Test Method. The crystalline polyester polyol preferably has a number average molecular weight (Mn) of at least 1000 g/mol, or even from 2000 g/mole to 4000 g/mole. Suitable crystalline polyester polyols include the reaction product of at least one diol (e.g., an aliphatic diol having a carbon chain of at least 2 carbon atoms, a cycloaliphatic diol, and combinations thereof), and at least one diacid (e.g., an aliphatic diacid, an aromatic diacid, and combinations thereof, having at least 10 carbon atoms, at least 12 carbon atoms, at least 14 carbon atoms, from 10 carbon atoms to 20 carbon atoms, from 12 carbon atoms to 20 carbon atoms, or even from 12 to 16 carbon atoms). One example of a useful aliphatic diol is ethylene glycol. Examples of suitable diacids include 1,12-dodecanedioic acid, 1,14-tetradecanedioic acid, sebacic acid, and combinations thereof. Specific examples of useful crystalline polyester polyols include ethylene glycol/tetradecanedioic acid, ethylene glycol/dodecanedioic acid, and mixtures thereof.

Useful crystalline polyester polyols are commercially available under a variety of trade designations, including, e.g., the DYNACOLL series of trade designations from Evonik Corporation (Parsippany, New Jersey) including DYNACOLL 7490 ethylene glycol/tetradecanedioic acid crystalline polyester polyol having a melting point of 90° C., as reported by the manufacturer, and a time to crystallization peak of 51 seconds, a crystallization peak temperature of 68.7° C., and a crystallization rate of 0.91° C./s, as measured according to the Crystallization by DSC Test Method, and DYNACOLL 7330 ethylene glycol/dodecanedioic acid, crystalline polyester polyol having a melting point of 85° C. as reported by the manufacturer, and a time to crystallization peak of 66 seconds, a crystallization peak temperature of 59° C., and a crystallization rate of 0.68° C./s, as measured by the Crystallization by DSC Test Method.

Polyether Polyol

The polyether polyol from which the polyurethane prepolymer is derived includes at least two hydroxyl groups. Useful polyether polyols include linear and branched polyether homopolymers and copolymers and the polyether polyol copolymers can have a variety of configurations including, e.g., random and block configurations. The polyether polyol is derived from cyclic oxide monomers (e.g., ethylene oxide, propylene oxide, 1,2-butylene oxide, 1,4-butylene oxide, and tetrahydrofuran), and optionally a polyfunctional initiator having at least two active hydrogens including, e.g., polyhydric alcohols (e.g., ethylene glycol, propylene glycol, diethylene glycol, cyclohexane dimethanol, glycerol, trimethylol-propane, pentaerythritol and bisphenol A), ethylenediamine, propylenediamine, triethanolamine, 1,2-propanedithiol, and combinations thereof.

Suitable alkylene oxide capped polyether polyols include the reaction product of an adduct of a first component (e.g., ethylene glycol, propylene glycol, diethylene glycol, dipropylene glycol, triethylene glycol 2-ethylhexanediol-1,3-glycerin, 1,2,6-hexane triol, trimethylol propane, trimethylol ethane, tris(hydroxyphenyl)propane, and combinations thereof), and a second component (e.g., ethylene oxide, propylene oxide, butylene oxide, and combinations thereof). Particularly useful polyether polyols include polyethylene glycol, polypropylene glycol, the reaction product of propylene oxide or butylene oxide capped or copolymerized with ethylene oxide (e.g., ethylene oxide capped propylene glycol), polytetramethylene ether glycol, and combinations thereof.

Suitable commercially available polyether polyols are available under a variety of trade designations including, e.g., under the TERATHANE series of trade designations from The Lycra Company (Wilmington, Del.) including TERATHANE 2000 polytetramethylene ether glycol and TERATHANE 1000 polyether glycol, under the VORANOL series of trade designations from Dow Chemical (Midland, Mich.) including VORANOL 220-056 polyether polyol and VORANOL 2000 L polypropylene glycol, under the DESMOPHEN, ARCOL and ACCLAIM series of trade designations from Covestro LLC (Pittsburgh, Pa.) including DESMOPHEN 2061 BD polypropylene ether polyol, DESMOPHEN 2060 BD polypropylene polyether polyol, ARCOL PPG-2000 polypropylene glycol ARCOL PPG-1000 polypropylene glycol, and ACCLAIM Polyol 703 polypropylene glycol, and PolyG polypropylene glycols and POLY-G 55-56 ethylene-oxide capped polyethylene glycol from Monument Chemical Kentucky LLC (Brandenburg, Ky.).

Diisocyanate

The diisocyanate from which the polyurethane prepolymer is derived can be any suitable diisocyanate including, e.g., aromatic diisocyanates, aliphatic diisocyanates, clycloaliphatic diisocyanates, and combinations thereof. Useful aromatic diisocyanates include, e.g., diphenyl methylene diisocyanate (MDI), (e.g., diphenylmethane-2,4'-diisocyanate (i.e., 2,4'-MDI), diphenylmethane-2,2'-diisocyanate (i.e., 2,2'-MDI), diphenylmethane-4,4'-diisocyanate (i.e., 4,4'-MDI), and combinations thereof), tetramethylxylene diisocyanate, naphthalene diisocyanate (e.g., naphthalene-1, 5-diisocyanate, naphthalene-1,4-diisocyanate, and combinations thereof), toluene diisocyanate (TDI) (e.g., 2,4-TDI, 2,6-TDI, and combinations thereof), and combinations thereof. Useful cycloaliphatic diisocyanates include, e.g., 1-isocyanatomethyl-3-isocyanato-1,5,5-trimethyl-cyclohexane (i.e., isophorone diisocyanate (i.e., IPDI), 1-methyl-2,4-diisocyanato-cyclohexane, 1,4-diisocyanato-2,2,6-trimethylcyclohexane (i.e., TMCDI), hydrogenation products of the aforementioned aromatic diisocyanates (e.g., hydrogenated 2,4'-MDI, hydrogenated 2,2'-MDI, hydrogenated 4,4'-MIDI and combinations thereof), and combinations thereof. Useful aliphatic diisocyanates include, e.g., hexamethylene diisocyanate (e.g., 1,6-diisocyanato-2,2,4-trimethylhexane, 1,6-diisocyanato-2,4,4-trimethylhexane diisocyanate, and combinations thereof), lysine diisocyanate, dodecane diisocyanate, dimer diisocyanate, and combinations thereof.

The isocyanate-terminated prepolymer optionally is stripped of residual monomeric diisocyanate such that the amount of monomeric diisocyanate is less than 0.5% by weight, less than 0.25% by weight, or even less than 0.1% by weight diisocyanate monomer.

Useful diisocyanate monomers are commercially available under a variety of trade designations including, e.g., under the DESMODUR and MODUR series of trade designations from COVESTRO LLC (Pittsburgh, Pa.) including, e.g., MODUR M 4,4'-MDI, LUPRANATE M 4,4'-MDI from BASF Corp. (Wyandotte, Mich.), and RUBINATE 44 from Huntsman Corp. (Auburn Hills, Mich.).

Clay

Useful clays include, e.g., kaolin clay (also referred to as China clay), calcined kaolin clay, ball clay, pyrophyllite, smectite (e.g., montmorillonite and bentonite smectites), Sepiolite, and combinations thereof. Useful clays exhibit a BET surface area of greater than 11 square meters per gram ($m^2/g$) greater than 15 $m^2/g$, or even greater than 20 $m^2/g$ as determined by ASTM D1993. Useful sources of kaolin clay include SNOBRITE white extender pigment having a median particle size of 0.5 μm and a BET surface are of 24 $m^2/g$ from Sibelco North America, Inc. (Charlotte, N.C.). The hot melt adhesive composition includes from 1% by weight to 40% by weight, from 5% by weight to 30% by weight, or even from 10% by weight to 20% by weight clay.

Polyester/Polyether Thermoplastic Elastomer

The polyester/polyether thermoplastic elastomer preferably exhibits a melting temperature of at least 125° C., at least 130° C., or even at least 140° C. (as determined according to ISO 11357-1/-3 at a ramp rate of 10° C. per minute) and a melt flow rate (MFR) of no greater than 50 g/10 min, no greater than 25 g/10 min, no greater than 15 g/10 min, or even from 2 g/10 min to 15 g/10 min when tested at 190° C. using a 2.16 kilogram weight. Useful polyester/polyether thermoplastic elastomers have a weight average molecular weight (Mw) of greater than 75,000 g/mol, or even greater than 100,000 g/mol. Useful polyester/polyether thermoplastic elastomers include hard polyester segments and soft polyester segments where the hard polyester segments are derived from dicarboxylic acid (e.g., terephthalic acid, isophthalic acid, phthalic acid, dibenzoic acid, and substituted dicarboxy compounds with benzene nuclei) and relatively low molecular weight diol, C2-C6 alkylene dials having molecular weights less than 250 g/mole (e.g., ethane diol, propane diol, isobutylene diol, and butanediol)) to form repeat units with molecular weights of less than 550 g/mole (i.e., short chain ester units), and the soft polyester segments are derived from the dicarboxylic acid and relatively high molecular weight polyols ((e.g., long chain polyols (e.g., glycols having molecular weights of at least 350 g/mole)), and optionally low molecular weight dials to form repeat units with higher molecular weights (i.e., long chain ester units)).

Useful long chain polyols used to prepare the soft segments have a molecular weight of from 350 g/mol to 6000 g/mol, from 600 g/mole to 3,000 g/mole or even from 1000 g/mol to 3000 g/mol. Useful long chain polyols (e.g., glycols) have melting points less than 55° C. and carbon atom to oxygen atom ratios of greater than 2.5:1. Useful long chain polyols include a polyalkylene glycols and glycol esters of poly(alkylene oxide) dicarboxylic acids in which the alkylene group includes from 2 to 9 carbon atoms (e.g., polyethylene glycol (PEG), polypropylene glycol (PPG), polytetramethylene ether glycol (PTMEG), and combinations thereof). Useful polyester/polyether copolymers are disclosed in U.S. Pat. No. 9,605,187 (Helmeke et al.), U.S. Pat. No. 5,939,499 (Anderson et al.), and U.S. Pat. No. 8,822,031 (Helmeke et al.). A particularly useful polyester/polyether thermoplastic elastomer is derived from terephthalic acid, 1,4-butanediol and polytetramethylene ether glycol having a number average molecular weight from 600 g/mole to 300 g/mole.

Useful polyester/polyether thermoplastic elastomers are commercially available under a variety of trade designations including, e.g., under the HYTREL series of trade designations from DuPont (Wilmington, Del.) including HYTREL 3078 polyester/polyether copolymer elastomer having a MFR of 5 g/10 min and under the RITEFLEX series of trade designations from Ticona GmbH (Germany) including RITEFLEX 425 thermoplastic elastomer having a MFR of 9 g/10 min.

First Thermoplastic Polymer: Vinyl-Derived Copolymer

Useful vinyl-derived copolymers include, e.g., ethylene-vinyl acetate copolymer, ethylene (alkyl)acrylate copolymer, and combinations thereof.

Useful ethylene vinyl acetate copolymers include from 30% by weight to 60% by weight, or even from 40% by weight to 60% by weight vinyl acetate. Suitable ethylene vinyl acetate copolymers are commercially available under a variety of trade designations including, e.g., the LEVAMELT series of trade designations from Lanxess Corporation (Pittsburgh, Pa.) including LEVAMELT 456 ethylene vinyl acetate copolymer, and the ATEVA series of trade designations including ATEVA 4030 from AT Plastics, Inc. (Edmonton, Alberta, Canada).

Suitable ethylene (alkyl)acrylate copolymers are derived from ethylene and at least one comonomer of a from C1 to C12 ester of acrylic and methacrylic acids including, e.g., methyl acrylate, ethyl acrylate, n-butyl acrylate, isobutyl acrylate, n-propyl acrylate, iso-propyl acrylate, methyl methacrylate, ethyl methacrylate, n-butyl methacrylate, isobutyl methacrylate, n-propyl methacrylate, iso-propyl methacrylate, and combinations thereof.

The moisture curable hot melt adhesive composition preferably includes from 1% by weight to 10% by weight, from 1% by weight to 8% by weight, or even from 2% by weight to 5% by weight vinyl-derived copolymer.

Optional Second Thermoplasticc Polymer

The moisture curable hot melt adhesive composition optionally includes a second thermoplastic polymer. The second thermoplastic polymer preferably includes hydroxy functional groups. Suitable second thermoplastic polymers include, e.g., thermoplastic polyurethanes (e.g., thermoplastic polyurethane derived from diols (e.g., ethylene glycol, diethylene glycol, 1,4-butanediol, 1,6-hexanediol, neopentylglycol, E-caprolactone, and combinations thereof), diacids (aliphatic diacids (e.g., sebacic acid, succinic acid, adipic acid, suberic acid, azelaic acid, dodecanedioic acid, glutaric acid, glutaric anhydride, and combinations thereof), aromatic diacids (e.g., phthalic acid, isophthalic acid, terephthalic acid, phthalic anhydride, and combinations thereof), and combinations thereof), and diisocyanate), thermoplastic polycaprolactones, and combinations thereof. The second thermoplastic polymer preferably exhibits a glass transition temperature Tg of no greater than −20° C., no greater than −30° C., or even no greater than −40° C. and a melting point of at least 60° C., at least 65° C., at least 70° C., at least 75° C., or even at least 80° C. Suitable second thermoplastic polymers have a time to crystallization peak in from 1 minute (min) to 10 mins, from 1 min to 5 mins, or even from 1 min to 4 mins as measured by the Crystallization by DSC Test Method. Useful thermoplastic polymers have a number average molecular weight (Mn) of at least 50,000 g/mol, at least 60,000 g/mol, at least 70,000 g/mol, or even at least 90,000 g/mol.

Suitable thermoplastic polymers are commercially available under a variety of trade designations including, e.g., under the CAPA series of trade designations from INGEVITY Corporation (North Charleston, S. C.) including CAPA 6500 polycaprolactone having a Mw of 50,000 g/mol and under the PEARLBOND series of trade designations from The Lubrizol Corporation (Wickliffe, Ohio) including PEARLBOND ECO 590, PEARLBOND 539 PEARLBOND 220 and PEARLBOND 520 thermoplastic polyurethanes.

The hot melt adhesive composition optionally includes from 0% by weight to 10% by weight, from 1% by weight to 8% by weight, or even from 2% by weight to 5% by weight thermoplastic polyurethane.

Tackifying Agent

The tackifying agent preferably has a ring and ball softening point of greater than 100° C., greater than 110° C., greater than 120° C., greater than 135° C., or even greater than 145° C. Useful tackifying agents have a volatile organic content (voc) of greater than 500 ppm, greater than 1000 ppm, no greater than 1500 parts per million (ppm), no greater than 1000 ppm, no greater than 750 ppm, no greater than 600 ppm, no greater than 500 ppm, no greater than 400 ppm, or even no greater than 300 ppm (as reported by the manufacturer). The tackifying agent can be a mixture of at least two tackifying agents in which one tackifying agent has a greater voc than another including, e.g., one tackifying agent has a voc greater than 500 ppm and one tackifying agent has a voc content less than 500 ppm.

Useful tackifying agents are derived from an aromatic moiety and ethylene and include, e.g., aromatic resins, aromatic-aliphatic resins (e.g., aromatic-aliphatic petroleum hydrocarbon resins), and combinations thereof. Suitable aromatic tackifying agents include tackifying agents derived from, e.g., styrene, alpha-methyl styrene, vinyl toluene, methoxy styrene, tertiary butyl styrene, chlorostyrene, indene, methylindene, coumorone-indene, and combinations thereof, optionally copolymerized with at least one ethylenically unsaturated monomer (e.g., 1,3-butadiene, cis-1,3-pentadiene, trans-1,3-pentadiene, 2-methyl-1,3-butadiene, 2-methyl-2-butene, cyclopentadiene, dicyclopentadiene, and combinations thereof).

Useful aromatic-aliphatic petroleum hydrocarbon resins include, e.g., C9-based resins, dicyclopentadiene-based resins, C5/C9 copolymer-based resins, and combinations thereof.

Useful tackifying agents are commercially available under a variety of trade designations including, e.g., the KRISTALEX series of trade designations from Eastman Chemical Company (Kingsport, Tenn.) including, e.g., KRISTALEX 5140 SD alpha-methyl styrene tackifying resin and KRISTALEX 3100 SD alpha-methyl styrene tackifying resin, HIKOTACK series of trade designations from Kolon Industries Inc. (Seoul, Republic of Korea) including HIKOTACK P110S C9 aromatic hydrocarbon resin, the ESCOREZ series of trade designations from ExxonMobil Chemical Company (Houston, Tex.) including, e.g., ESCOREZ 5637 aromatic modified, cycloaliphatic hydrocarbon resin, ESCOREZ 5600 aromatic modified, cycloaliphatic hydrocarbon resin, ESCOREZ 5615 aromatic modified, cycloaliphatic hydrocarbon resin, and ESCOREZ 5690 aromatic modified, cycloaliphatic hydrocarbon resin, the WINGTACK series of trade designations from Cray Valley HSC (Exton, Pa.) including, e.g., WINGTACK 86 aromatically modified, C-5 hydrocarbon resin, WINGTACK EXTRA aromatically modified, C-5 hydrocarbon resin, and the PICCOTAC series of trade designations from Eastman Chemical Company (Kingsport, Tenn.) including, e.g., PICCOTAC 8095 aromatically modified, C-5 hydrocarbon resin. KRISTALEX, PLASTOLYN and PICCOTEX alpha-methylstyrene tackifying agents manufactured by Eastman Chemical Co. (Kingsport, Tenn.).

The hot melt adhesive composition includes at least 5% by weight, from 10% by weight to no greater than 60% by weight, at least 10% by weight, from 15% by weight to 55% by weight, from 15% by weight to 50% by weight, from 5% by weight to 35% by weight, or even from 20% by weight to 45% by weight of the tackifying agent.

Catalyst

The moisture curable hot melt adhesive composition optionally includes a catalyst to increase the cure reaction rate. Useful catalysts include catalyst include ether and morpholine functional groups, examples of which include di(2,6-dimethyl morpholinoethyl)ether and 4,4'-(oxydi-2,1-ethanediyl)bis-morpholine (DMDEE). Suitable commercially available catalysts include, e.g., JEFFCAT DMDEE 4,4'-(oxydi-2,1-ethanediyl)bis-morpholine, which is available from Huntsman Corp. (Houston, Tex.). Other suitable catalysts include, e.g., metallic carboxylates and dibutyl tin dilaurate. Useful metallic carboxylates include, e.g., cobalt carboxylates, manganese carboxylates, and mixtures thereof.

When a catalyst is present, the adhesive composition includes from about 0.01% by weight to about 0.5% by weight catalyst based on the weight of the adhesive composition.

In some embodiments, the moisture-curing catalyst is present during the formation of the polyurethane prepolymer and becomes incorporated into the backbone of the polyurethane prepolymer.

Additives

The hot melt adhesive composition optionally includes a variety of additional components including, e.g., antioxidants, stabilizers, additional polymers (e.g., styrene block copolymers, vinyl alcohol copolymers, and combinations thereof), adhesion promoters, ultraviolet light stabilizers, adhesion promoters (i.e., silane-based adhesion promoters), rheology modifiers, corrosion inhibitors, colorants (e.g., pigments (e.g., carbon black (e.g., PTMEG dispersed carbon black)) and dyes), fillers, flame retardants, nucleating agents, and combinations thereof.

Useful antioxidants include, e.g., pentaerythritol tetrakis [3,(3,5-di-tert-butyl-4-hydroxyphenyl)propionate], 2,2'-methylene bis(4-methyl-6-tert-butylphenol), phosphites including, e.g., tris-(p-nonylphenyl)-phosphite (TNPP) and bis(2,4-di-tert-butylphenyl)4,4'-diphenylene-diphosphonite, di-stearyl-3,3'-thiodipropionate (DSTDP), and combinations thereof. Useful antioxidants are commercially available under a variety of trade designations including, e.g., the IRGANOX series of trade designations including, e.g., IRGANOX 1010, IRGANOX 565, and IRGANOX 1076 hindered phenolic antioxidants, and IRGAFOS 168 phosphite antioxidant, all of which are available from BASF Corporation (Florham Park, N.J.), and ETHYL 702 4,4'-methylene bis(2,6-di-tert-butylphenol), which is available from Albemarle Corporation (Baton Rouge, La.). When present, the adhesive composition preferably includes from about 0.1% by weight to about 2% by weight antioxidant.

Useful optional fillers include, e.g., fumed silica, wollastonite, and combinations thereof.

The moisture curable hot melt adhesive composition can be formed by any suitable method. Useful methods of forming the moisture curable hot melt adhesive composition include, e.g., combining the isocyanate-terminated polyurethane prepolymer, clay, polyester/polyether elastomer, vinyl-derived copolymer, tackifying agent and any optional components such as a thermoplastic polymer in any order, combining the isocyanate-terminated polyurethane prepolymer, with a composition that includes clay, polyester/polyether elastomer, vinyl-derived copolymer, tackifying agent and any optional components such as a thermoplastic polymer, forming the isocyanate-terminated polyurethane prepolymer and then adding at least one of the clay, polyester/polyether elastomer, vinyl-derived copolymer, tackifying agent and any optional component in any order, forming the isocyanate-terminated polyurethane prepolymer in the presence of at least one of the clay, polyester/polyether elastomer, vinyl-derived copolymer, tackifying agent and any optional components such as a thermoplastic polymer, combining the clay, polyester/polyether elastomer, vinyl-derived copolymer, tackifying agent and any optional components such as a thermoplastic polymer in any order and then adding isocyanate-terminated polyurethane prepolymer, and combinations thereof. In any of the aforementioned methods, components of the composition can be added sequentially, simultaneously, substantially simultaneously, and combinations thereof.

Use

The moisture curable hot melt adhesive composition is useful in a variety of applications including, e.g., permanently bonding two substrates together and preventing the movement of a first substrate relative to a second substrate. The moisture curable hot melt adhesive composition can be formulated to be suitable for use in bonding substrates having a variety of properties including, e.g., polar substrates, nonpolar substrates, rigid substrates (i.e., the substrate cannot be bent by an individual using two hands or will break if an attempt is made to bend the substrate with two hands), flexible substrates (e.g., flexible substrates (i.e., the substrate can be bent using no greater than the force of two hands), porous substrates, conductive substrates, insulating substrates, transparent substrates, and combinations thereof, and substrates in a variety of forms including, e.g., sheets (e.g., metal sheet, polymer sheet, glass sheet, continuous sheets, discontinuous sheets, and combinations thereof), films (e.g., polymer film, metallized polymer film, continuous films, discontinuous films, and combinations thereof), foils (e.g., metal foil), fibers, threads, yarns, wovens, nonwovens, and combinations thereof.

The moisture curable hot melt adhesive composition can be formulated to be suitable for use in bonding a variety of substrates together including substrates that include, e.g., polymer (e.g., polycarbonate, polyolefin (e.g., polypropylene, polyethylene, low density polyethylene, linear low density polyethylene, high density polyethylene, polypropylene, and oriented polypropylene, copolymers of polyolefins and other comonomers), polyether terephthalate, ethylene-vinyl acetate, ethylene-methacrylic acid ionomers, ethylene-vinyl-alcohols, polyesters, e.g. polyethylene terephthalate, polycarbonates, polyamides (e.g. Nylon-6 and Nylon-6,6), polyvinyl chloride, polyvinylidene chloride, cellulosics, polystyrene, and epoxy), polymer composites (e.g., composites of a polymer and metal, cellulose, glass, polymer, and combinations thereof), metal (aluminum, copper, zinc, lead, gold, silver, platinum, and magnesium, and metal alloys such as steel, tin, brass, and magnesium and aluminum alloys), carbon-fiber composite, other fiber-based composite, graphene, glass (e.g., alkali-aluminosilicate toughened glass and borosilicate glass), quartz, boron nitride, gallium nitride, sapphire, silicon, carbide, ceramic and combinations thereof. Particularly useful applications include bonding a polycarbonate substrate to a polypropylene substrate through the cured adhesive composition.

The moisture curable hot melt adhesive composition is suitable for use in a variety of industrial applications including, e.g., adhering components of automobiles, sealing components of automobiles, applications in the automotive industry (e.g., vehicle construction (e.g., headlamp construction)), recreational vehicles, window construction, appliances, filters, electronic assemblies, wood materials, plastic materials, laminated panels, edge-banding, profile wrapping, packaging, and textiles.

The adhesive composition can be applied using any suitable application method including, e.g., manual or automatic fine line dispensing, slot die coating, roll coating, gravure coating, transfer coating, pattern coating, screen printing, spray coating, filament coating, by extrusion, air knife, trailing blade, brushing, dipping, doctor blade, offset gravure coating, rotogravure coating, and combinations thereof. The moisture curable adhesive composition can be in a continuous or discontinuous (e.g., pattern) form and can be applied as a bead, coating, layer (e.g., a single layer and multiple layers), and combinations thereof.

The adhesive composition can be applied at any suitable temperature including, e.g., from 120° C. to 190° C., or even from 140° C. to 180° C.

The surface of the substrate on which the moisture curable adhesive composition is applied optionally is treated to enhance adhesion using any suitable method for enhancing adhesion to the substrate surface including, e.g., corona treatments, chemical treatments, flame treatments, and combinations thereof.

The invention will now be described by way of the following examples. All parts, ratios, percentages and amounts stated in the Examples are by weight unless otherwise specified.

EXAMPLES

Test Procedures

Test procedures used in the examples include the following. All ratios and percentages are by weight unless otherwise indicated. The procedures are conducted at room temperature (i.e., an ambient temperature of from 20° C. to 25° C.) unless otherwise specified.

Crystallization by DSC Test Method

The time to crystallization transition and the crystallization peak temperature are determined on a differential scanning calorimetry (DSC) instrument according to ASTM E-793-01 entitled, "Standard Test Method for Heats of Fusion and Crystallization by Differential Scanning calorimetry," using the following conditions. The component to be tested is heated to a temperature above its melting temperature at a rate of 100° C. per minute (° C./min), and then cooled at a rate of 30° C./min. The time and temperature at which the component exhibits an exothermic crystallization transition peak is noted and recorded in seconds and degrees Celsius (° C.), respectively, and referred to as the time to crystallization peak and the crystallization peak temperature, respectively.

Time to Crystallization Transition by Rheology Test Method

The time to the start of the crystallization transition is assessed using parallel plate rheology. The rheometer parallel plate environmental temperature control is set to 150° C. A sample of molten adhesive composition is applied to the bottom parallel plate and the rheometer is programmed for testing as follows:

The samples are first conditioned for 200 seconds (s) at 150° C. Then, sample testing is started while simultaneously setting the parallel plate environmental temperature to 25° C., and the oscillation settings are set to 0.1% strain and 10.0 radians per second angular frequency. The program is run for a minimum of 15 minutes, or until there is no appreciable change in complex modulus. The time at which the crystallization transition starts, if present, is recorded, and is referred to herein as crystallization transition time. A crystallization transition is a rapid increase in the rate of positive change of the storage modulus.

Temperature of Crystallization Transition by Rheology Test Method

The temperature at which the start of the crystallization transition occurs is assessed using parallel plate rheology. The rheometer parallel plate environmental temperature control is set to 150° C. A sample of molten adhesive composition is applied to the bottom parallel plate and the rheometer is programmed for testing as follows:

The samples are first conditioned for 200 seconds (s) at 150° C. and the oscillation settings are set to 0.1% strain and 10.0 radians per second angular frequency. Then, sample testing is started while simultaneously cooling the sample at a rate of 3° C./min. The program is run for a minimum of 15 minutes, or until there is no appreciable change in complex modulus. The temperature at which the storage modulus becomes greater than the loss modulus, which is the crossover temperature, is recorded. The temperature at which a crystallization transition starts, if present, is recorded, and is referred to herein as crystallization transition temperature. A crystallization transition is a rapid increase in the rate of positive change of the storage modulus.

Overlap Shear Test Method

Sample Preparation Method

A number of 1 in ×4 in ×0.125 in (2.54 cm×10.16 cm×0.3175 cm) polycarbonate and polypropylene substrates are rinsed using a water and free rinsing soap mixture. Each substrate is then wiped using a microfiber cloth until it is dry. The substrates are then placed in a controlled environment at 23° C. and 50% relative humidity for 24 hours prior to making samples from the substrates. The polypropylene substrates are then plasma surface treated to a surface energy of at least 40 dynes per centimeter (dynes/cm).

Two 1.25 in long by 0.03 inch (3.175 cm×0.0762 cm) thick spacer wires are placed on the polypropylene substrate parallel to the 1 inch (2.54 cm) dimension of the polypropylene substrate. These spacer wires ensure that each overlap shear is 0.03 inches (0.0762 cm) thick. The spacer wires are long enough to allow for removal after the bond is made. Each bond has a 1 in×1 in ×0.03 in (2.54 cm×2.54 cm×0.0762 cm) bond dimension. A small amount of the adhesive composition to be tested is placed on top of the wire spacers on the polypropylene surface. The polycarbonate substrate is then aligned with the polypropylene substrate to ensure that the width and length of the bond area is 1 in×1 in (2.54 cm×2.54 cm). Pressure is applied to the polycarbonate, for no more than 5 seconds, until excess adhesive squeezes out from the bonded area. Once the adhesive composition has hardened enough to handle the sample without disrupting the dimensions, the excess adhesive is cleaned off the sample substrate and the spacer wires are removed. The samples are then placed in a controlled environment at 23° C. and 50% relative humidity.

Test Method

Upon reaching the specified cure time, the sample strength is evaluated on a tensile testing machine such as an Instron machine. The samples are pulled at rate of 12.7 mm/min. Both the maximum load value and the failure mode of the sample are obtained and recorded.

Five Minute Overlap Shear Test Method

Five minute overlap shear strength is determined according to the Overlap Shear Strength Test Method set forth above with the exception that a timer is started immediately after the bond is made. At five minutes after the bond was made, the overlap shear of the sample is measured until failure. The maximum load and failure mode are recorded. A total of three samples are tested and the average maximum load and failure mode are recorded. If the substrate breaks, the maximum load at failure is recorded.

High Temperature Overlap Shear Test Method

The high temperature overlap shear strength is measured at 107° C. after preparing the bond sample as described above in the Overlap Shear Test Method with the exception that the sample is allowed to cure at 23° C. and 50% relative humidity for 14 days. The sample is then placed in an INSTRON tensile testing machine equipped with a controlled environment chamber that has been set to 107° C. and conditioned for 30 minutes at 107° C. Each sample is tested in overlap shear mode until failure. The maximum load and failure mode are recorded. A total of three samples are tested and the average maximum load and failure mode are recorded. If the substrate breaks the maximum load at failure is recorded.

Static Load at 3 Minutes Test Method

A 7 mm×20 mm×8 mm channel of a plasma treated polypropylene test jig is filled with the adhesive composition to be tested. Immediately after filling the channel with adhesive composition the 20 mm×3 mm end of a 20 mm×254 mm×3 mm polycarbonate plaque is placed in the adhesive composition such that the polycarbonate plaque stands up in the channel and is positioned perpendicular to the channel. The bond area is 322.58 mm². A 6.8 kilogram (kg) weight is suspended from the polycarbonate plaque 3 minutes after the plaque has been inserted into the adhesive composition. The time to failure is recorded as the static load time. If the time to failure is greater than the test period, it is recorded as a pass. If the time to failure is greater than ten minutes, the static load of the adhesive composition is recorded as a pass at ten minutes.

Modified Static Load Test Method

The test sample is prepared, and the test method is conducted, as described above in the Static Load at 3 Minutes Test method with the exception that the point in time at which the 6.8 kg weight is suspended from the polycarbonate plaque differs. For a one minute test method, the 6.8 kg weight is suspended from the polycarbonate plaque one minute after the adhesive composition has been applied to the channel and the polycarbonate plaque has been inserted into the adhesive composition. For a two minute test method, the 6.8 kg weight is suspended from the polycarbonate plaque two minutes after the adhesive composition has been applied to the channel and the polycarbonate plaque has been inserted into the adhesive composition.

Reflow Test Method

A 7 mm×20 mm×8 mm channel of a plasma treated polypropylene test jig is filled with the adhesive composition to be tested. Immediately after filling the channel with adhesive composition the 20 mm×3 mm end of a 20 mm×254 mm×3 mm polycarbonate plaque is placed in the adhesive composition such that the polycarbonate plaque stands up in the channel and is positioned perpendicular to the channel. The bond area is 322.58 mm². The adhesive composition is allowed to cure at room temperature for the following periods: 15 minutes, 30 minutes, 60 minutes, 4 hours (h), 24 h, and 48 h. After the curing time, the test sample is hung vertically in a test chamber and allowed to dwell at 120° C. for 4 h. The test sample is then carefully removed from the chamber and, within 10 minutes of removal, the adhesive is evaluated. The test sample is then placed back in the chamber for another 20 h, for a total dwell time of 24 h. The sample is evaluated at each cure time by visual inspection with the naked eye. If adhesive is not visible outside of the initial bond area, the adhesive is deemed to exhibit no reflow. If adhesive is visible outside of the initial bond area, the adhesive is deemed to have reflowed.

Viscosity Test Method

Viscosity is measured on a molten sample that is at a temperature of 163° C. using a Brookfield Thermosel Viscometer using a number 27 spindle at 10 rotations per minute.

Average % Change in Viscosity Test Method

The average % change in viscosity per hour is determined by measuring the viscosity of the composition at temperature (T) according to the Viscosity Test Method over a period of 8 hours (t). The initial viscosity reading after 30 minutes in the viscometer is recorded as Vi and the viscosity reading after testing for a period of 8 hours is recorded as Vt. The average percentage change in viscosity is calculated according to the following formula:

% Change in Viscosity=[[(Vt−Vi)/Vi]*100]/8,

Fogging Test Method

Fogging is determined and tested according to Jun. 1, 2007, 2$^{nd}$ Edition, ISO6452 entitled, "Rubber or Plastic Coated Fabrics-Determination of Fogging Characteristics of Trim Materials in the Interior of automobiles." This test is completed on a fully cured or crosslinked adhesive. The results are reported as % transmittance.

Examples 1-4

A moisture curable hot melt adhesive composition was prepared as follows and the amount of each component was as set forth in Table 1. DYNACOLL 7490 ethylene glycol/tetradecanedioic acid crystalline polyester polyol having a Mn of about 3500 g/mol and a melting point of 90° C. (as reported by manufacturer), TERATHANE PTMEG 2000 polytetramethylene ether glycol and pigment were combining and heated to 120° C. until liquid. The mixture was then held under vacuum for about one hour to dry the mixture. Then diphenylmethane 4,4'-diisocyanate was added to the mixture under a nitrogen blanket, followed by pulling a vacuum. The reaction was allowed to proceed for 1 hour at 120° C. to form a polyurethane prepolymer. The free isocyanate (NCO) was measured and determined to be at least 2%.

Tackifying agent(s), kaolin clay having a median particle size of 0.5 μm and a BET surface area of 24 g/m², and LEVAMELT 456 ethylene vinyl acetate were heated to 175° C. until the components were liquid. The mixture was mixed under vacuum for 1 hour at 175° C. The temperature of the mixture was then increased to from 185° C. to 190° C. Then HYTREL 3078 polyester/polyether copolymer was added, and a vacuum was applied for one hour. After one hour, PEARLBOND ECO 590 thermoplastic polyurethane was added to the mixture and the temperature was allowed to decrease to 175° C. The mixture was held under vacuum for from 15-30 minutes or until the mixture appeared entirely homogeneous. Then, the polyurethane prepolymer and DMDEE 4,4'-(oxydi-2,1-ethanediyl)bis-morpholin were added and the temperature was allowed to decrease to 165° C. Mixing was continued, under vacuum, for 30 minutes or until a uniform composition was obtained. The amount of each component was as set forth in Table 1.

Control C1

A moisture curable hot melt adhesive composition was prepared according to the method disclosed above in Examples 1-4 with the exception that PIOTHANE 3500 HD was used instead of DYNACOLL 7490 and the amounts of the components were as set forth in Table 1 below. PIOTHANE 3500 HD has a time to crystallization peak of 76.80 seconds, a crystallization peak temperature of 52.6° C., and a crystallization rate of 0.58° C./s, as measured by the Crystallization by DSC Test Method.

Example 5

A moisture curable hot melt adhesive composition was prepared according to the method disclosed above in Examples 1-4 with the exception that PEARLBOND ECO 590 was not added to the composition and the amounts of the components were as set forth in Table 1 below.

The moisture curable polyurethane hot melt adhesive compositions of Examples 1-5 and Control 1 were tested according to one or more of the Viscosity, Average % Change in Viscosity, 5 Minute Overlap Shear, High Temperature Overlap Shear, Rheological Time to Crystallization Transition, Rheological Temperature of Crystallization Transition, and Fogging (% transmittances test methods. The results are reported in Table 1.

TABLE 1

| | 1 | 2 | 3 | 4 | C1 | 5 |
|---|---|---|---|---|---|---|
| HIKOTACK P-110S Tackifying Resin | 37.47 | 35.24 | 22.60 | 23.60 | 37.47 | 24.00 |
| HYTREL 3078 Thermoplastic Elastomer | 10.71 | 8.79 | 10.57 | 8.57 | 10.70 | 8.78 |
| LEVAMELT 456 Ethylene Vinyl Acetate | 4.89 | 4.46 | 4.89 | 4.89 | 4.89 | 5.01 |
| DYNACOLL 7490 Polyester polyol | 14.98 | 14.98 | 14.98 | 14.98 | 0.00 | 15.72 |
| PIOTHANE 3500 HD | 0.00 | 0.00 | 0.00 | 0.00 | 14.98 | 0.00 |
| TERATHANE PTMEG 2000 Polyether polyol | 8.75 | 8.75 | 8.75 | 8.75 | 8.75 | 9.18 |
| Pigment | 0.90 | 0.90 | 0.90 | 0.90 | 0.90 | 0.95 |
| Diisocyanate | 8.13 | 8.13 | 8.13 | 8.13 | 8.13 | 8.53 |
| Catalyst | 0.18 | 0.18 | 0.18 | 0.18 | 0.18 | 0.19 |
| PEARLBOND ECO 590 Thermoplastic Polyurethane | 4.00 | 4.00 | 4.00 | 3.00 | 4.00 | 0.00 |
| Kaolin Clay | 10.00 | 14.57 | 10.00 | 12.00 | 10.00 | 12.30 |
| KRISTALEX 5140 Tackifying Resin | 0.00 | 0.00 | 15.00 | 15.00 | 0.00 | 15.34 |
| Viscosity (cP) | 18530 | 16250 | 24190 | 18230 | 20350 | 12,000 |
| % Change in Viscosity | −4 | −5 | −3 | −3 | −2 | 0.8 |
| 5 Minute Overlap Strength (N) | 598 | ND | ND | 988 | 428 | 886 |
| High Temperature Overlap Shear Strength (N) | 684 | ND | ND | 644.8 | 682 | 638 |
| Time to Crystallization Transition (seconds) | 241.8 | ND | 216.0 | 208.8 | 750 | 300 |
| Temperature of Crystallization Transition (° C.) | 47.03 | ND | 53.25 | 49.01 | ND | ND |
| % Transmittance | 92.8 | 89.6 | 98.3 | 98.7 | ND | ND |

ND = not determined

Figure 1:
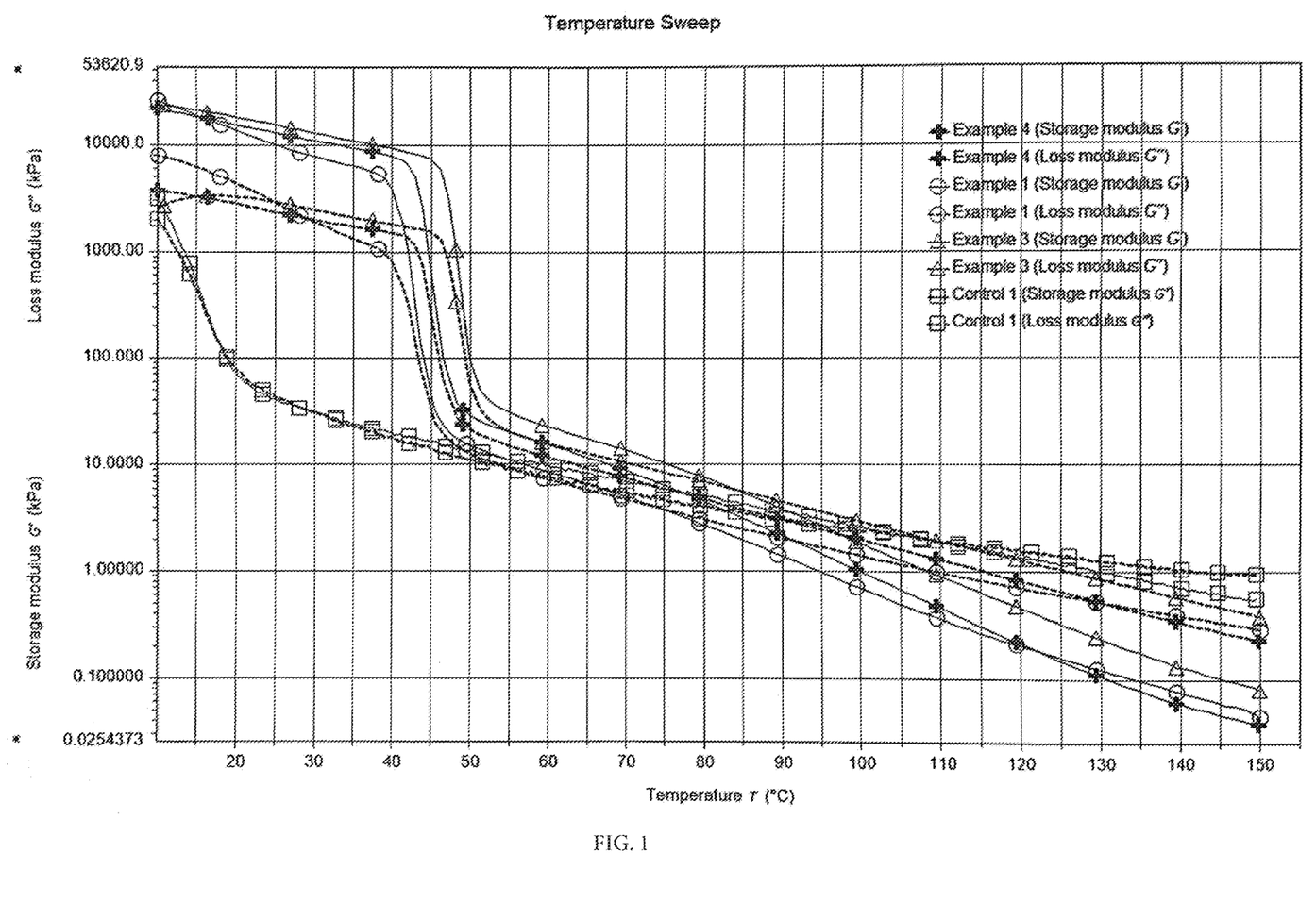
FIG. 1 are plots of the storage modulus in kPa and loss modulus in kPa versus temperature in degrees Celsius for the composition of Examples 1, 3 and 4, and Control C1.

Plots of the temperature of crystallization transition of Examples 1, 3 and 4 and Control C1 are set forth in FIG. 1, in which the solid and dotted lines with circles reflect the storage and loss moduli, respectively, of Example 1, the solid and dotted lines with triangles reflect the storage and loss moduli, respectively, of Example 3, the solid and dotted lines with crosses reflect the storage and loss moduli, respectively, of Example 4, and the solid and dotted lines with squares reflect the storage and loss moduli, respectively, of Control C1. The x axis is temperature in degrees Celsius and the y axis is storage modulus in kilopascals (kPa) and loss modulus in kPa.

Figure 2:
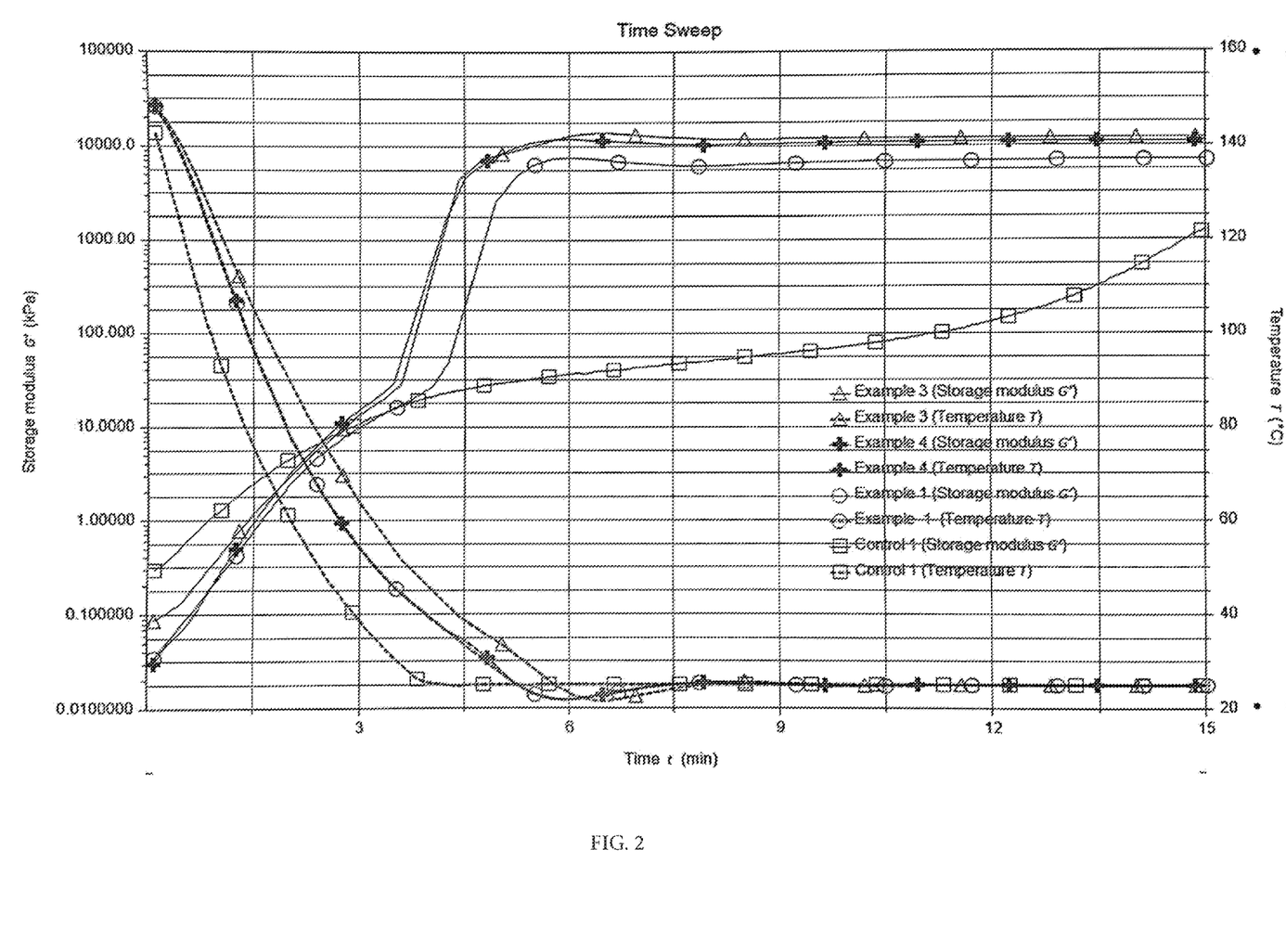
FIG. 2 are plots of the storage modulus in kPa and temperature versus time for the composition of Examples 1, 3 and 4, and Control C1.

Plots of the time to crystallization transition of Examples 1, 3 and 4 and Control C1 are set forth in FIG. 2, in which the solid and dotted lines with circles reflect the storage modulus and temperature, respectively, of Example 1, the solid and dotted lines with triangles represent reflect the storage modulus and temperature, respectively, of Example 3, the solid and dotted lines with crosses reflect the storage modulus and temperature, respectively, of Example 4, and the solid and dotted lines with squares reflect the storage modulus and temperature, respectively, of Control C1. The x axis is time in minutes, the left y axis is storage modulus in kPa, and the right y axis is temperature in degrees Celsius.

What is claimed is:

1. A moisture curable hot melt adhesive composition comprising:
   isocyanate-terminated polyurethane prepolymer comprising a reaction product of crystalline polyester polyol exhibiting a crystallization peak temperature of at least 55° C., polyether polyol, and diisocyanate;
   clay;
   polyester/polyether thermoplastic elastomer;
   a first thermoplastic polymer selected from the group consisting of ethylene vinyl acetate copolymer, ethylene (alkyl)acrylate copolymer, and combinations thereof;
   a second thermoplastic polymer selected from the group consisting of thermoplastic polyurethane, thermoplastic polycaprolactone, and combinations thereof; and
   a first tackifying agent.

2. The moisture curable hot melt adhesive composition of claim 1 comprising
   from 10% by weight to 50% by weight isocyanate-terminated polyurethane prepolymer; and
   from 1% by weight to 40% by weight clay.

3. The moisture curable hot melt adhesive composition of claim 1 comprising
   from 25% by weight to 45% by weight isocyanate-terminated polyurethane prepolymer; and
   from 5% by weight to 30% by weight clay.

4. The moisture curable hot melt adhesive composition of claim 1, wherein the isocyanate-terminated polyurethane prepolymer has an NCO:OH ratio of from 5:1 to 2:1.

5. The moisture curable hot melt adhesive composition of claim 1, wherein the isocyanate-terminated polyurethane prepolymer has an NCO:OH ratio of from 4:1 to 3:1.

6. The moisture curable hot melt adhesive composition of claim 1 comprising from 10% by weight to 20% by weight clay.

7. The moisture curable hot melt adhesive composition of claim 1 comprising from 5% by weight to 35% by weight tackifying agent.

8. The moisture curable hot melt adhesive composition of claim 1 further comprising a second tackifying agent,
   the first tackifying agent comprising an aromatic hydrocarbon resin, and
   the second tackifying agent comprising an alpha-methyl styrene tackifying agent.

9. The moisture curable hot melt adhesive composition of claim 1, wherein the crystalline polyester polyol exhibits a crystallization peak temperature of at least 60° C.

10. The moisture curable hot melt adhesive composition of claim 1, wherein the crystalline polyester polyol is derived from a diol having at least 2 carbon atoms and a diacid having from 10 to 20 carbon atoms.

11. The moisture curable hot melt adhesive composition of claim 1, wherein the crystalline polyester polyol is derived from ethylene glycol and a diacid selected from the group consisting of tetradecanedioic acid, dodecanedioic acid, and combinations thereof.

12. The moisture curable hot melt adhesive composition of claim 1, wherein the second thermoplastic polymer exhibits a melting point of at least 80° C.

13. The moisture curable hot melt adhesive composition of claim 1, wherein the composition exhibits a Five Minute Overlap Shear Strength of at least 500 Newtons.

14. The moisture curable hot melt adhesive composition of claim 1, wherein the composition exhibits a Five Minute Overlap Shear Strength of at least 600 Newtons.

15. The moisture curable hot melt adhesive composition of claim 1, wherein the composition exhibits a High Temperature Overlap Shear Strength of at least 640 Newtons.

16. The moisture curable hot melt adhesive composition of claim 1, wherein the composition passes the Static Load at 3 Minutes Test Method.

17. The moisture curable hot melt adhesive composition of claim 1, wherein the composition, upon cooling from melt, exhibits a crystallization transition time of no greater than 215 seconds.

18. The moisture curable hot melt adhesive composition of claim 1, wherein the composition, upon cooling from melt, exhibits a crystallization transition temperature of at least 45° C.

19. The moisture curable hot melt adhesive composition of claim 1, wherein the composition exhibits at least 90% transmittance when tested according to the Fogging Test Method.

20. The moisture curable hot melt adhesive composition of claim 1, wherein the composition exhibits 100% transmittance when tested according to the Fogging Test Method.

21. A moisture curable hot melt adhesive composition comprising:
   isocyanate-terminated polyurethane prepolymer comprising the reaction product of a crystalline polyester polyol exhibiting a crystallization peak temperature of at least 55° C., a polyether polyol, and diisocyanate;
   clay;
   polyester/polyether thermoplastic elastomer;
   a thermoplastic polymer selected from the group consisting of ethylene vinyl acetate copolymer, ethylene (alkyl)acrylate copolymer, and combinations thereof; and
   a first tackifying agent.

22. An article comprising:
   a first substrate;
   a second substrate; and
   the cured adhesive composition of claim 1, the first substrate being bonded to the second substrate through the cured adhesive composition.

23. The article of claim 22, wherein the first substrate comprises polycarbonate, and the second substrate comprises polypropylene.

24. A head lamp comprising:
   a polycarbonate substrate;
   a polypropylene substrate, and
   the cured adhesive composition of claim 1, the polycarbonate substrate being bonded to the polypropylene substrate through the cured adhesive composition.

25. The moisture curable hot melt adhesive composition of claim 21, wherein the polyester/polyether thermoplastic elastomer has a melt flow rate no greater than 25 g/10 min when tested at 190° C. using a 2.16 kilogram weight.

26. The moisture curable hot melt adhesive composition of claim 1, wherein the polyester/polyether thermoplastic elastomer has a melt flow rate no greater than 25 g/10 min when tested at 190° C. using a 2.16 kilogram weight.

27. The moisture curable hot melt adhesive composition of claim 1, wherein the polyester/polyether thermoplastic elastomer has a melt flow rate no greater than 15 g/10 min when tested at 190° C. using a 2.16 kilogram weight.

28. The moisture curable hot melt adhesive composition of claim 21 further comprising a second tackifying agent,
   the first tackifying agent comprising an aromatic hydrocarbon resin, and the second tackifying agent comprising an alpha-methyl styrene tackifying agent.

29. The moisture curable hot melt adhesive composition of claim 21 comprising from 5% by weight to 30% by weight clay.

* * * * *